United States Patent
Santurkar et al.

(10) Patent No.: US 7,410,293 B1
(45) Date of Patent: Aug. 12, 2008

(54) TECHNIQUES FOR SENSING TEMPERATURE AND AUTOMATIC CALIBRATION ON INTEGRATED CIRCUITS

(75) Inventors: Vikram Santurkar, Fremont, CA (US); Quyen Doan, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 251 days.

(21) Appl. No.: 11/383,937

(22) Filed: May 17, 2006

Related U.S. Application Data

(60) Provisional application No. 60/786,129, filed on Mar. 27, 2006.

(51) Int. Cl.
*G01K 7/00* (2006.01)
(52) U.S. Cl. .................. 374/178; 374/170; 327/512
(58) Field of Classification Search .............. 374/178, 374/170, 171, 172
See application file for complete search history.

(56) References Cited

U.S. PATENT DOCUMENTS

| | | | |
|---|---|---|---|
| 5,876,122 A | 3/1999 | Eryurek | |
| 6,847,319 B1 | 1/2005 | Stockstad | |
| 6,882,213 B2 * | 4/2005 | Kim | 327/512 |
| 6,956,512 B1 | 10/2005 | San et al. | |
| 6,995,588 B2 | 2/2006 | Gee | |
| 7,204,638 B2 * | 4/2007 | Hsu | 374/1 |
| 2003/0086406 A1 * | 5/2003 | Batra et al. | 370/345 |
| 2005/0074051 A1 * | 4/2005 | Won et al. | 374/170 |
| 2006/0018364 A1 * | 1/2006 | Kim et al. | 374/183 |
| 2006/0078037 A1 * | 4/2006 | Lee et al. | 374/170 |
| 2006/0267668 A1 * | 11/2006 | Porter | 327/512 |
| 2007/0098041 A1 * | 5/2007 | Seo | 374/170 |
| 2007/0160113 A1 * | 7/2007 | Kim et al. | 374/178 |
| 2008/0043810 A1 * | 2/2008 | Vogt et al. | 374/170 |

\* cited by examiner

*Primary Examiner*—Gail Verbitsky
*Assistant Examiner*—Mirellys Jagan
(74) *Attorney, Agent, or Firm*—Steven J. Cahill

(57) ABSTRACT

Techniques are provided for sensing the temperature of an integrated circuit (IC). A diode is provided on an IC. The voltage across the diode varies with the temperature of the IC. A feedback loop is coupled around the diode to monitor the voltage across the diode. The feedback loop contains a comparator and logic circuitry that outputs a digital code. The digital code varies in response to changes in the diode voltage. The value of the digital code can be used to determine the temperature on the IC. Techniques are also provided for automatically calibrating a temperature sensing circuit to compensate for inaccuracies caused by variations in process, temperature, and supply voltage. A calibration circuit is added to the feedback loop in the temperature sensor. The calibration circuit generates an offset code that is used to adjust the digital code to compensate for variations in temperature, process, and supply voltage.

20 Claims, 9 Drawing Sheets

TECHNIQUES FOR SENSING TEMPERATURE AND AUTOMATIC CALIBRATION ON INTEGRATED CIRCUITS

CROSS REFERENCES TO RELATED APPLICATIONS

This application claims the benefit of U.S. provisional patent application 60/786,129, filed Mar. 27, 2006, which is incorporated by reference herein.

BACKGROUND OF THE INVENTION

1. Field of the Invention

The present invention relates to electronic circuits, and more particularly, to techniques for sensing temperature on a circuit and automatically calibrating temperature sensing circuits to compensate for process, temperature, and supply voltage variations.

2. Description of the Related Art

The operating temperature of an integrated circuit (IC) can significantly effect its performance. A significant change in the operating temperature of an IC can cause the IC to operate outside desired performance specifications. Temperature sensing devices have been developed to monitor the operating temperature of integrated circuits so that performance characteristics can be more tightly controlled.

Traditionally, the temperature of an integrated circuit die is sensed with a temperature sensing diode (TSD) and an off-chip temperature sensor. The TSD is a PN junction diode. The two terminals of the diode, which is located in the corner of the die, are routed to a pin to work with the off-chip temperature sensor.

Off-chip temperature sensors require large components that are external to the integrated circuit. Many of today's integrated circuit die contain a large number of pins that require numerous external components. Because board space is usually limited, there is a need to provide techniques for sensing the temperature of an integrated circuit, while reducing the number of external components.

BRIEF SUMMARY OF THE INVENTION

According to some embodiments of the present invention, techniques are provided for sensing the temperature of an integrated circuit (IC) using on-chip circuitry. A diode is provided on an IC. A feedback loop is coupled around the diode to monitor the voltage across the diode. The feedback loop contains a comparator and logic circuitry that outputs a digital code. The digital code controls the gate voltages of transistors in the feedback loop.

The digital code varies in response to any changes in the voltage across the diode. The voltage across the diode varies with the temperature of the IC. As a result, the value of the digital code can be used to determine the temperature on the IC.

According to further embodiments of the present invention, techniques are provided for automatically calibrating a temperature sensing circuit to compensate for inaccuracies caused by variations in process, temperature, and supply voltage. A calibration circuit is added to the feedback loop in the temperature sensor. The calibration circuit generates an offset code that is used to adjust the digital code to compensate for variations in temperature, process, and supply voltage on the IC.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
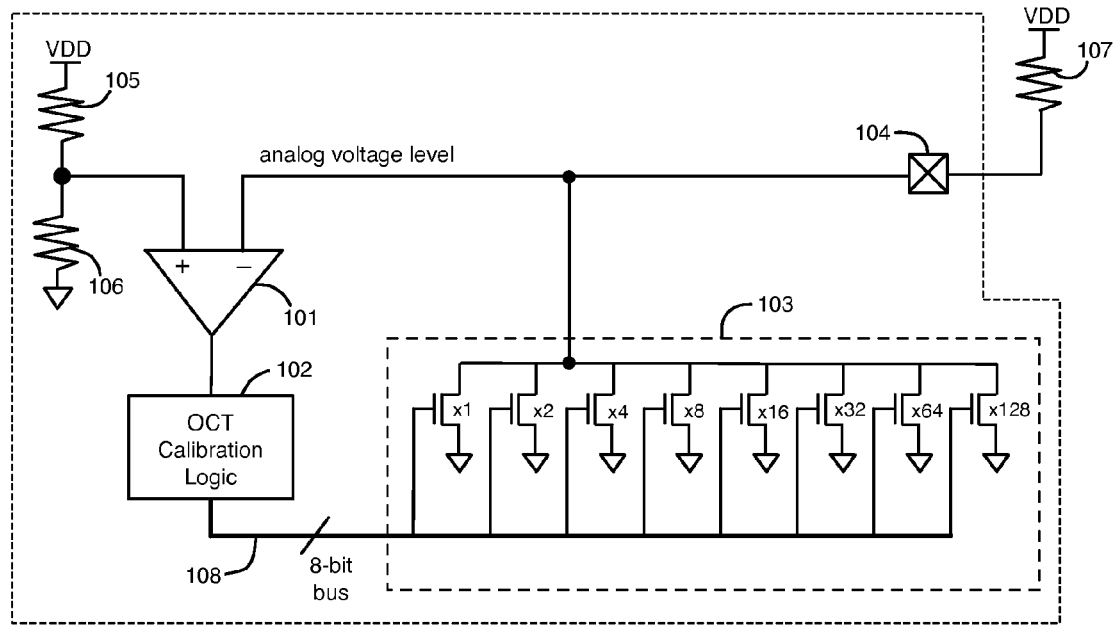
FIG. 1 illustrates the pull-down section of an on-chip termination calibration circuit.

An on-chip termination calibration circuit is shown in FIG. 1. An input/output (IO) pin 104 with only the pull-down section of the input/output (IO) buffer is connected to an external resistor 107. The pull-down section 103 contains binary weighted NMOS transistors that are coupled together in parallel. The gates of these transistors are controlled by OCT calibration logic 102. OCT calibration logic 102 generates 8 digital output signals that are transmitted to the gates of the NMOS transistors along an 8-bit bus 108. The NMOS transistors in section 103 have binary weighted channel width-to-length (W/L) ratios of 1x, 2x, 4x, 8x, 16x, 32x, 64x, and 128x, respectively.

A comparator 101 compares the analog voltage level of IO pin 104 against an internal reference voltage level generated by a resistor divider formed by resistors 105 and 106. The result of this comparison is transmitted to an input of OCT calibration logic 102. OCT calibration logic 102 modifies the gate control setting of the transistors in the pull-down section 103 through 8-bit bus 108. The circuit of FIG. 1 converges on the gate control setting on bus 108 that matches the analog voltage level with the internal reference level from resistors 105/106. At this stage, the digital signals on 8-bit bus 108 are transmitted to regular IO buffers (not shown), where they are used as the calibrated pull-down gate setting to control the on-chip termination impedance.

Figure 2:
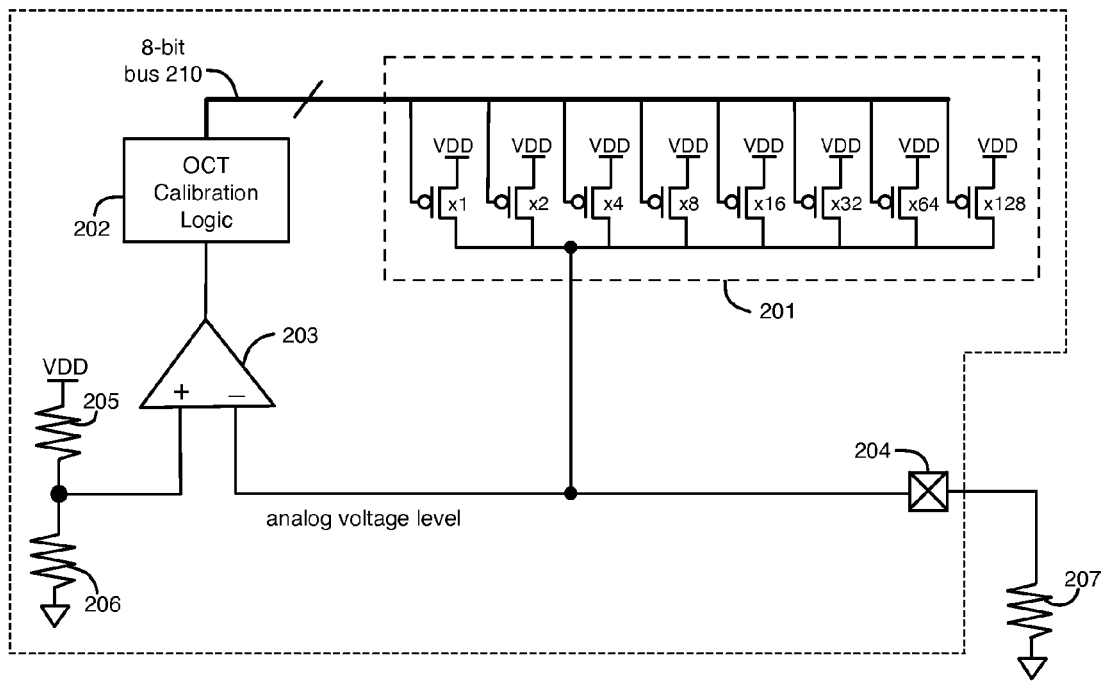
FIG. 2 illustrates the pull-up section of an on-chip termination calibration circuit.

A circuit architecture for the pull-up section of an OCT calibration circuit is shown in FIG. 2. In FIG. 2, the pull-up section 201 of the IO buffer contains binary weighted PMOS transistors. FIG. 2 also includes OCT calibration logic 202, comparator 203, pin 204, on-chip resistors 205-206, and off-chip resistor 207.

At the convergence of the analog voltage level with the reference voltage level from resistors 205-206, the 8-bit digital code on bus 210 is transmitted to regular IO buffers (not shown), where they are used as the calibrated pull-up gate setting to control the on-chip termination impedance.

Figure 3:
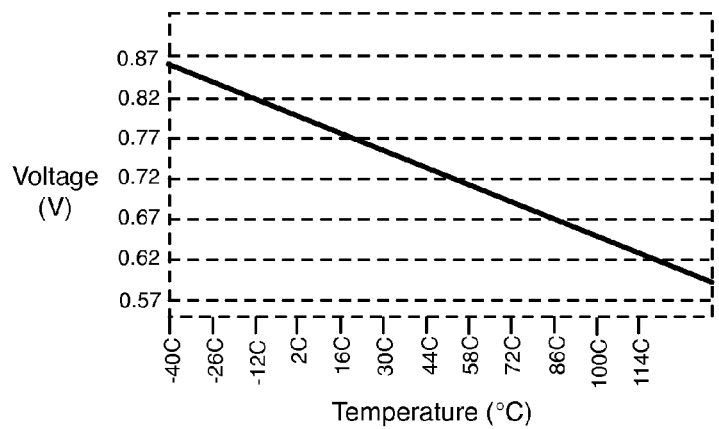
FIG. 3 is a graph that illustrates the variation of the voltage across a diode with temperature.

The voltage across a PN junction diode varies as a function of its temperature, as shown in FIG. 3. Each temperature produces a unique voltage across the diode. The voltage across a PN junction diode typically varies linearly across the temperature range shown in FIG. 3.

Figure 4:
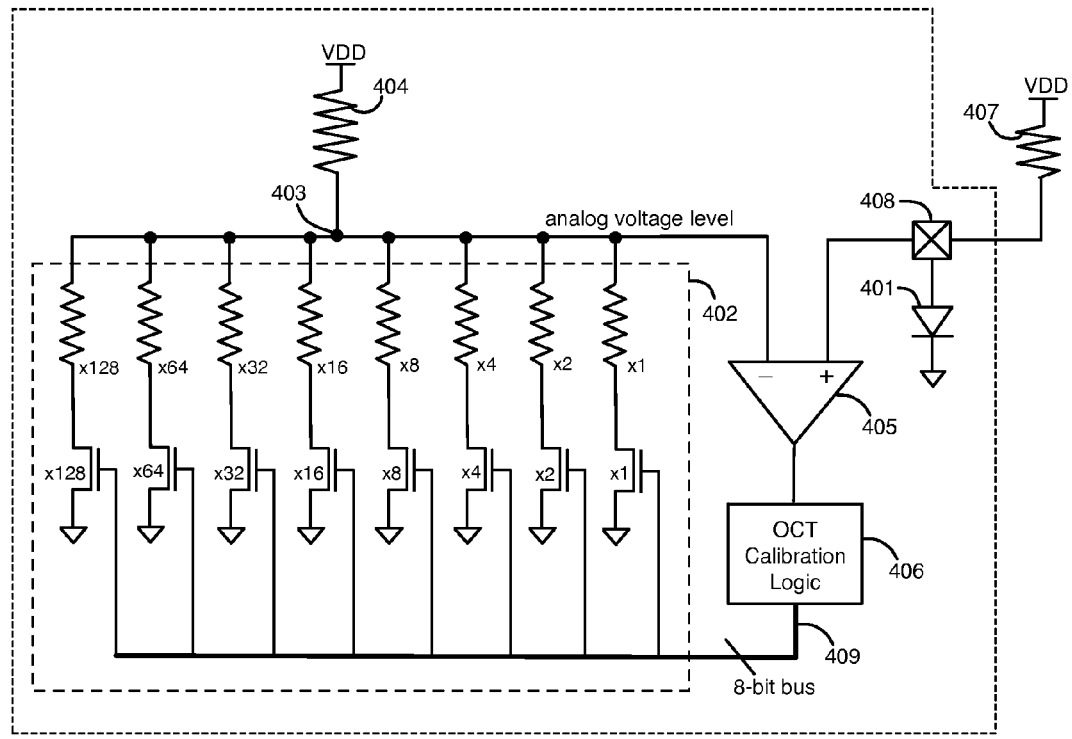
FIG. 4 illustrates a temperature sensing circuit, according to one embodiment of the present invention.

According to an embodiment of the present invention, the on-chip termination calibration circuit architecture of FIG. 1 can be modified for the purposes of temperature sensing as shown in FIG. 4. Referring to FIG. 4, an IO pin 408 is connected to an internal diode 401. Diode 401 can be a PN junction diode, a bipolar junction transistor connected as a diode (i.e., short base to collector), a Schottky diode, or any other type of diode. An external resistor 407 is coupled to pin 408. The branch containing diode 401 provides a reference voltage level that is temperature dependent, as shown in FIG. 3.

A pull-down section 402 contains 8 binary weighted NMOS transistors that are coupled in parallel. Section 402 also has 8 binary weighted resistors that are connected in series with the 8 binary weighted NMOS transistors. The binary weighted transistors in section 402 have the following channel W/L ratios, 128x, 64x, 32x, 16x, 8x, 4x, 2x, 1x. The resistances of the binary weighted resistors in section 402 have the same ratios as the corresponding NMOS transistors, 128x, 64x, 32x, 16x, 8x, 4x, 2x, 1x. According to further embodiments of the present invention, section 402 can have more or less than 8 transistors and a corresponding number of resistors.

The other ends of the binary weighted resistors in section 402 are coupled to an intermediate node 403 to one offset resistor 404. The offset resistor 404 is coupled to a supply voltage VDD. The intermediate node 403 forms the comparison node for comparator 405 and is the analog voltage level for comparison.

Because the NMOS transistors in section 402 have very low impedances, the binary weighted resistors are added to section 402 to create a variable voltage divider that generates the analog voltage level. Temperature and process variations that cause changes in the resistances of resistor 404 and the resistors in section 402 do not effect the analog voltage level, because it is generated by a resistor divider ratio. The resistors in section 402 and resistor 404 are preferably the same type of resistors. The resistors in section 402 and resistor 404 can be any suitable type of resistors.

The comparator 405 compares the reference voltage level at pin 408 with the analog voltage level and feeds the result to OCT calibration logic 406. In response to the output of comparator 405, logic 406 generates an 8-bit digital code that is transmitted through bus 409 to control the current through the binary weighted transistors in section 402. Logic 406 modifies the 8-bit digital code on bus 409 so that the reference and the analog voltage levels are matched.

According to one embodiment of FIG. 4, all of the output signals of OCT calibration logic 406 are initially low (00000000). When the output of comparator 405 is low, OCT calibration logic 406 increases the binary value of the digital signals on 8-bit bus 409, causing more current to flow through section 402. When the output of comparator 405 is high, OCT calibration logic 406 decreases the binary value of the digital signals on 8-bit bus 409, causing less current to flow through section 402. OCT calibration logic 406 can use any suitable technique to modify the binary value of the digital signals on bus 409. For example, OCT calibration logic 406 can use a successive approximation algorithm.

Comparator 405, OCT calibration logic 406, the binary weighted resistors and transistors in section 402, diode 401, and resistor 404 form a feedback loop that converts an analog voltage at pin 408 into a digital code on 8-bit bus 409. When the feedback loop reaches a stable state, the resulting output of logic 406 is an 8-bit digital code that represents the voltage of the reference diode 401. This 8-bit code maps to a unique temperature value based on the diode voltage characteristic shown in FIG. 3. Therefore, the 8-bit code can be used to determine the temperature of the circuit. The 8-bit code can, for example, be transmitted to other circuitry that decodes the code to determine an estimate of the temperature.

The feedback loop of FIG. 4 is an analog-to-digital converter that performs a temperature sensing function in conjunction with diode 401. The temperature sensing circuit of FIG. 4 minimizes customer board space by integrating an analog-to-digital converter (ADC) function into the integrated circuit.

Figure 5:
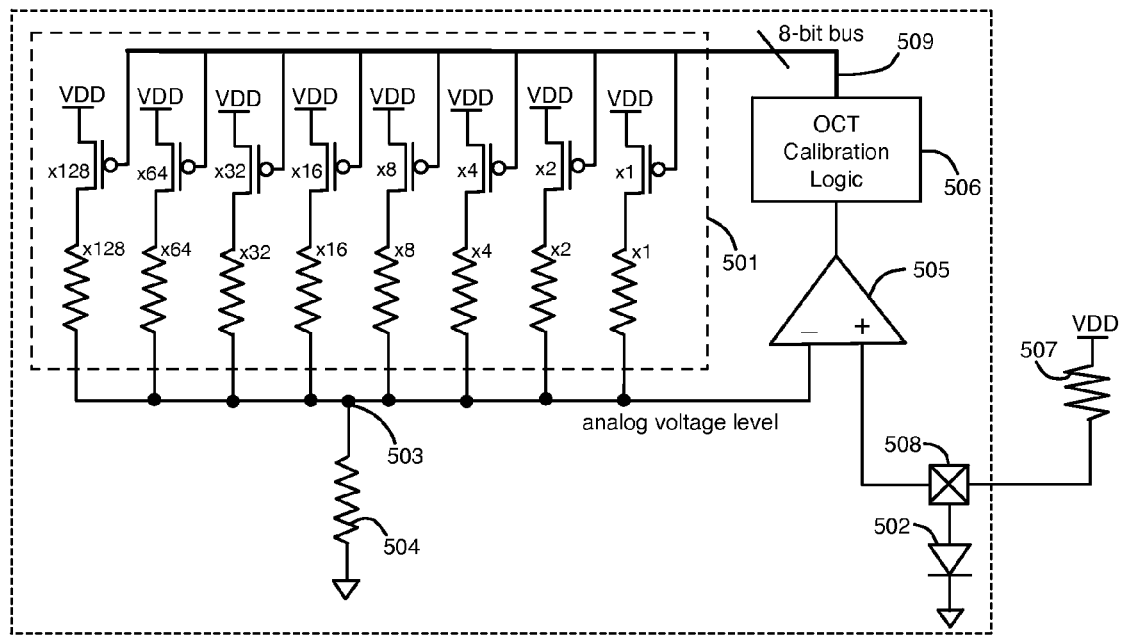
FIG. 5 illustrates another temperature sensing circuit, according to a further embodiment of the present invention.

According to another embodiment of the present invention, the on-chip termination calibration circuit architecture of FIG. 2 can be modified for the purposes of temperature sensing as shown in FIG. 5. FIG. 5 illustrates a temperature sensing circuit architecture using PMOS transistors for the pull-up section 501. Referring to FIG. 5, an IO pin 508 is connected to an internal PN junction diode 502 and an external resistor 507. The branch containing diode 502 provides a reference voltage level.

A section 501 contains 8 binary weighted current sources formed using 8 binary weighted PMOS transistors coupled in parallel and 8 binary weighted resistors coupled in series with the PMOS transistors. The binary weighted transistors in section 501 have the following channel W/L ratios, 128x, 64x, 32x, 16x, 8x, 4x, 2x, 1x, respectively. The resistances of the binary weighted resistors in section 501 have the same ratios as the corresponding PMOS transistors, 128x, 64x, 32x, 16x, 8x, 4x, 2x, 1x. According to further embodiments of the present invention, section 501 can have more or less than 8 parallel transistor/resistor branches.

The binary weighted resistor network in section 501 is coupled to a single offset resistor 504 at an intermediate node 503. The offset resistor 504 is connected to a VSS supply voltage (e.g., ground). Resistor 504 and the resistors in section 501 are preferably the same type of resistor, so that variations in temperature and process do not effect the analog voltage level.

The intermediate node 503 forms the comparison node for comparator 505 and is the analog voltage level shown in FIG.

5. The 8-bit code output of logic circuit 506 on 8-bit bus 509 represents the voltage of the reference diode 502. This 8-bit code maps to a unique temperature value based on the diode voltage characteristic shown in FIG. 3. Therefore, the 8-bit code can be used to determine the temperature of the circuit.

Comparator 505, OCT calibration logic 506, the binary weighted resistors and transistors in section 501, diode 502, and resistor 504 form a feedback loop that converts an analog voltage at pin 508 into a digital code on 8-bit bus 509. This feedback loop is an analog-to-digital converter that performs a temperature sensing function in conjunction with diode 502. The temperature sensing circuit of FIG. 5 minimizes customer board space by integrating an analog-to-digital converter (ADC) function into the integrated circuit.

Figure 6:
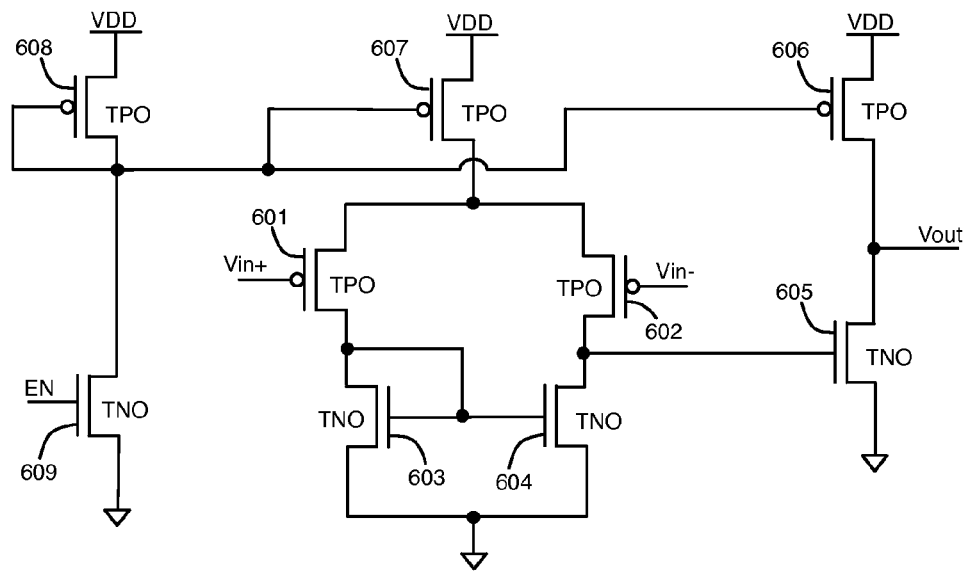
FIG. 6 illustrates an example of a comparator that can be used in a temperature sensor circuit, according to an embodiment of the present invention.

FIG. 6 illustrates one example of circuitry that can be used to form comparators 405 and 505, according to an embodiment of the present invention. Many other types of comparator circuits can be used to implement the present invention. The circuitry of FIG. 6 includes PMOS transistors 601-602 and 606-608 as well as NMOS transistors 603-605 and 609. The inputs Vin+ and Vin− of the comparator are coupled to the gates of PMOS transistors 601 and 602. PMOS transistors 601-602 and current mirror 603-604 form a differential amplifier.

One input of the comparator is coupled to a diode. The voltage across the diode can drop down to 0.6 volts (or less) at high temperatures as shown in FIG. 3. Such a low voltage is below the threshold voltage of most NMOS transistors. Therefore, PMOS transistors 601-602 are selected to form the differential amplifier. The PMOS transistors 601-602 are driven more as the diode voltage decreases.

PMOS transistors 601-602 are preferably very closely matched in terms of their sizes. The input offset voltage between transistors 601 and 602 is preferably as close to zero as possible (e.g., 1 mV). All of the transistors 601-609 are preferably large sized transistors. In addition, the comparator of FIG. 6 preferably has a high gain (e.g., 90 dB).

Figure 7:
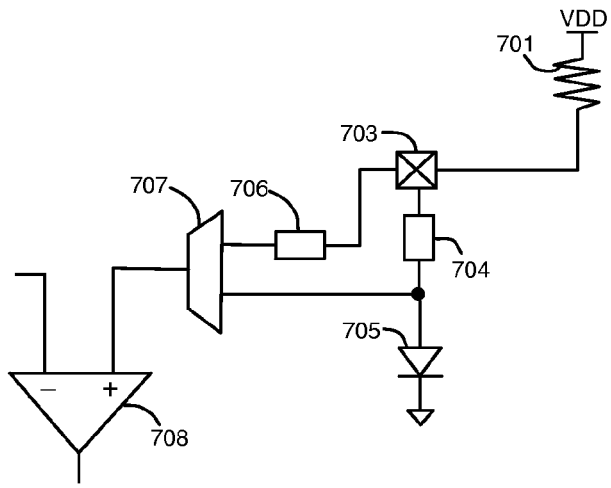
FIG. 7 illustrates circuitry that can be added to a temperature sensing feedback loop to provide a dual-purpose temperature sensor and on-chip termination calibration circuit, according to another embodiment of the present invention.

According to a further embodiment of the present invention, either of the feedback loops shown in FIGS. 4-5 can be used as a dual-purpose temperature sensor circuit and on-chip termination calibration circuit. The multiplexer 707 shown in FIG. 7 can be used to couple or decouple the plus input of a comparator 708 to a diode 705. Comparator 708 is part of a feedback loop as shown, e.g., in FIGS. 4-5.

When switch 704 is open, and switch 706 is closed, multiplexer 707 couples its upper input to the plus input of comparator 708, decoupling diode 705 from comparator 708. During this state of switches 704 and 706, the feedback loop can be used as an on-chip calibration circuit. When switch 704 is closed, and switch 706 is open, multiplexer 707 couples its lower input to the plus input of comparator 708. During this second state, diode 705 is coupled to comparator 708, and the feedback loop can be used as a temperature sensor, as described above.

Both of the circuit architecture shown in FIGS. 4 and 5 are effective in measuring the temperature of the integrated circuit chip with +/−5 degrees Celsius accuracy. However, the binary weighted transistors, the comparator, the on-chip resistor network, the reference diode, and the external resistor in the circuit architectures of FIGS. 4 and 5 have potential sources of process, supply voltage, and temperature variations.

These variations impact the resulting accuracy of the temperature output code from the temperature sensing circuit. For example, process variations between two IC die can cause different output digital codes at the same temperature. According to another embodiment of the present invention, the temperature sensing circuit can be calibrated before using it for temperature sensing to reduce or eliminate inaccuracies caused by these variations.

Figure 8A:
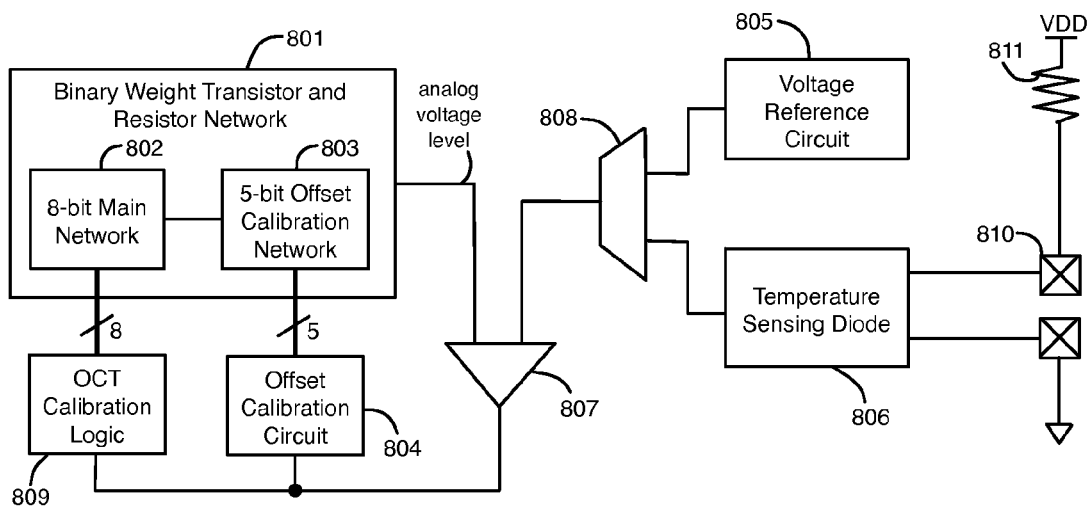
FIG. 8A illustrates an automatic calibration circuit that compensates for inaccuracies in a temperature sensing circuit that are caused by process, temperature, and supply voltage variations, according to another embodiment of the present invention.

The architecture shown in FIG. 5 is modified as shown in FIG. 8A. The binary weighted PMOS transistor and resistor network 801 in FIG. 8A contains two sections. The two sections are the main 8-bit network 802 that is used for temperature sensing and a second 5-bit network 803 that is used for offset tuning of the main network 802.

Figure 8B:
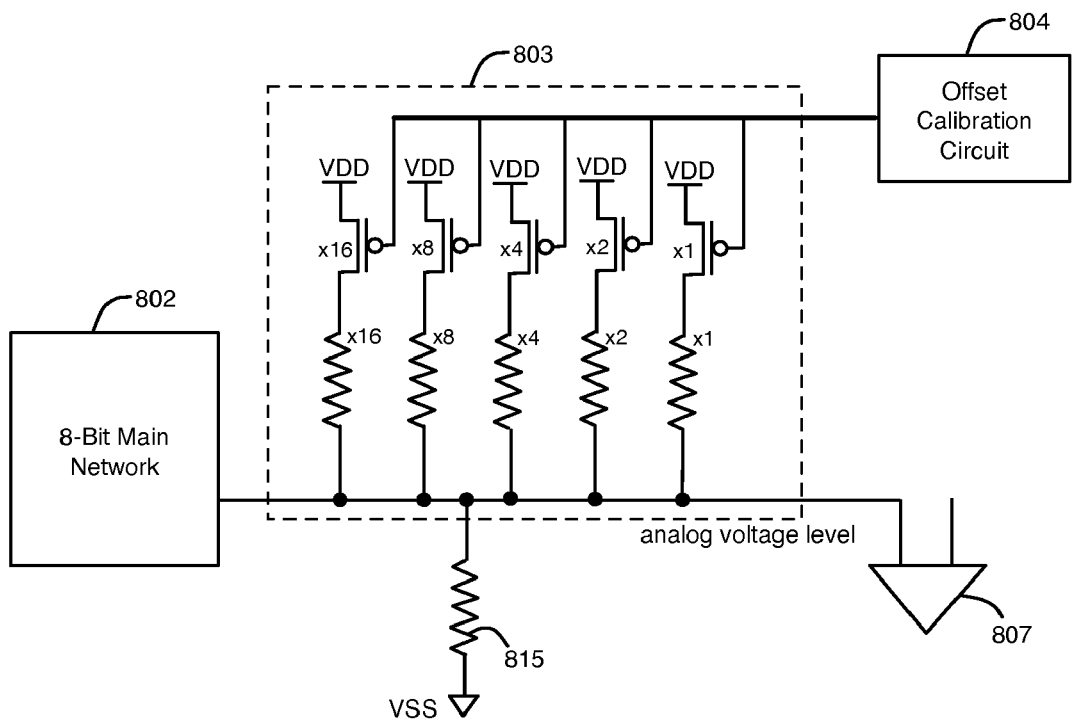
FIG. 8B illustrates an example of the 5-bit offset calibration network shown in FIG. 8A, according to an embodiment of the present invention.

The main 8-bit network 802 can, for example, be identical to the binary weighted resistor and transistor network 501 shown in FIG. 5. The 5-bit calibration network 803 contains a set of 5 binary weighted transistors that are coupled in parallel, as shown for example, in FIG. 8B. Each of the 5 transistors in network 803 is coupled in series with a binary weighted resistor, as shown in FIG. 8B. The binary weighted resistors in the 8-bit main network 802 and the binary weighted resistors in the 5-bit offset calibration network 803 are coupled to VSS through a single offset resistor 815.

Although the transistors in FIG. 8B are shown in PMOS, the 8-bit main network 802 and the 5-bit offset calibration network 803 can have pull-down NMOS transistors instead of pull-up PMOS transistors. According to further embodiments of FIGS. 8A/8B, offset calibration network 803 can have more or less than 5 parallel transistor/resistor branches.

The 5-bit offset calibration network 803 is controlled by the offset calibration circuit 804 to set the appropriate offset voltage for the 8-bit main network 802. The 5-bit offset network 803 outputs a 5-bit digital offset code embodying one of 32 different offset voltage levels that either shift-up or shift-down the voltage characteristic of FIG. 3 to compensate for process, supply voltage, and temperature variations.

A bandgap voltage reference circuit 805 outputs a constant reference voltage that is divided down to the threshold voltage of the diode 806 at a particular temperature (e.g., 25° C.). The output reference voltage of bandgap voltage reference circuit 805 is independent of variations in the process, supply voltage, and temperature. The output reference voltage of circuit 805 is used for referencing the offset calibration circuit 804 to compensate for any inaccuracies in the feedback loop that are caused process, supply voltage, or temperature variations.

Figure 9:
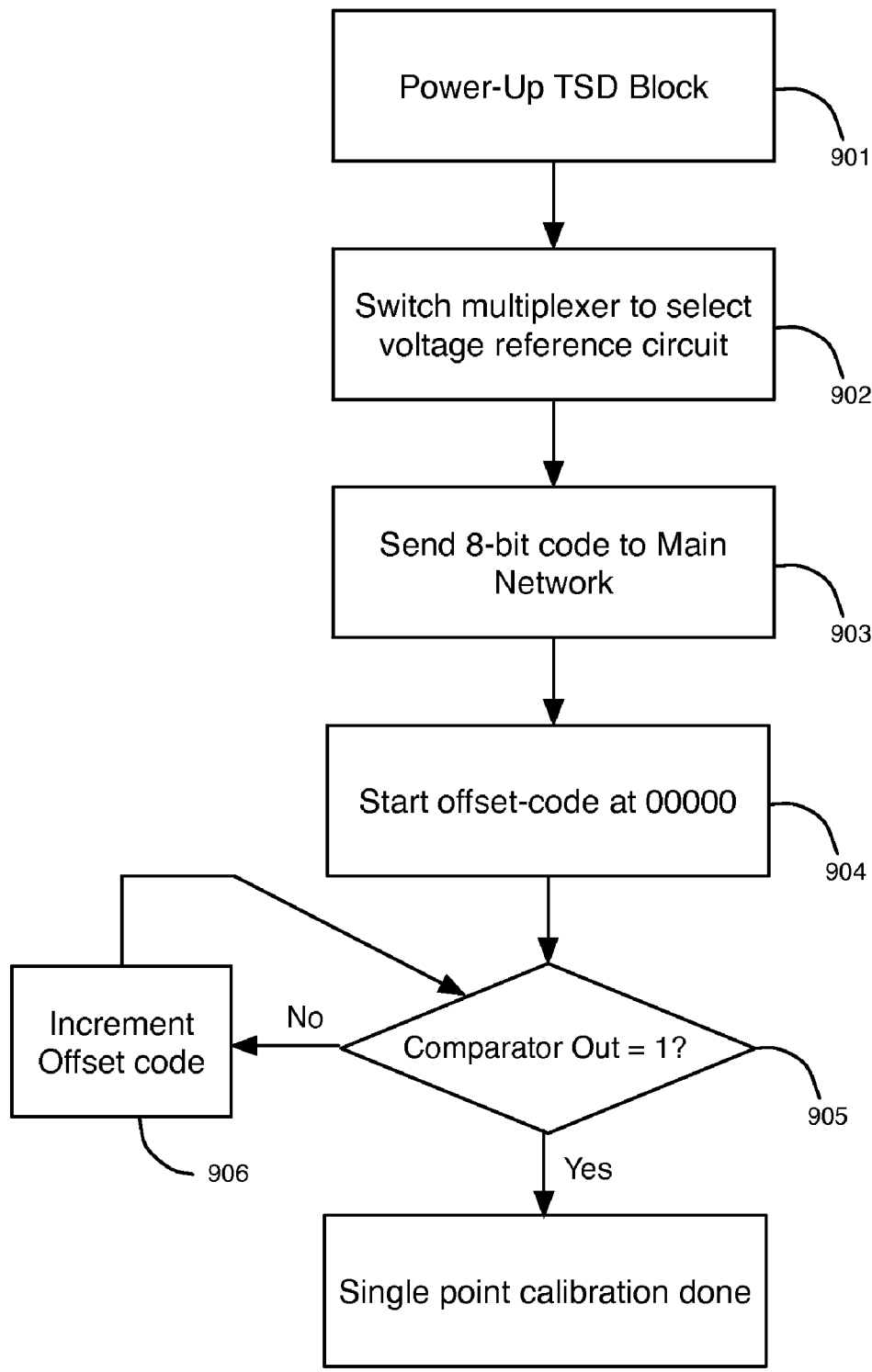
FIG. 9 illustrates a process for automatically calibrating the temperature sensing circuit of FIG. 8A to compensate for inaccuracies caused by process, temperature, and supply voltage variations, according to another embodiment of the present invention.

The process for offset calibration is shown in the flow-chart of FIG. 9. This process is implemented in the circuitry shown in FIG. 8A. After the temperature sensing diode (TSD) block 806 is powered up at step 901, multiplexer 808 is switched to select the bandgap voltage reference circuit 805 at step 902. At step 903, the OCT calibration block 809 is disabled, and a predefined 8-bit code that is generated for the current temperature (e.g., 25° C.) is transmitted to the gates of the transistors in the 8-bit main network 802. The states of the transistors in 8-bit main network 802 are static during the offset calibration process.

The offset calibration circuit 804 initially generates an offset code of 00000 at step 904. The offset code is transmitted to the gates of the transistors in 5-bit offset calibration network 803. The offset calibration circuit 804 increments the binary value of the 5-bit offset code in each iteration of step 906 until the output of comparator 807 equals 1 (high) at step 905.

The feedback loop containing comparator 807, offset calibration circuit 804, and 5-bit offset calibration network 803 converges on the gate control setting that matches the analog voltage level with the output voltage of the bandgap reference circuit 805. This gate control setting is stored in the offset calibration circuit 804 and used to control the states of the PMOS transistors in the 5-bit offset calibration network 803 during temperature sensing.

During temperature sensing, multiplexer 808 couples the output of temperature sensing diode 806 to an input of comparator 807. Offset calibration circuit 804 outputs an offset code (i.e., the gate control setting generated during the process of FIG. 9). This offset code remains constant during temperature sensing. The OCT calibration logic 809 (now enabled) adjusts the current through 8-bit main network 802 to match the output of diode 806 and to generate an 8-bit code that accurately represents the current temperature, as described above with respect to FIGS. 4-5.

The offset code generated by offset calibration circuit 804 may be accurate only within a range of temperatures and supply voltages that are close to the values that existed in the circuit when the offset code was generated using the process of FIG. 9. If the temperature or supply voltage changes significantly, a new offset code can be generated using the process of FIG. 9 to ensure greater accuracy of the temperature sensor.

The offset calibration circuit of FIG. 8A ensures that the temperature sensing circuit can provide accuracy better than +/−5° C. for on-chip ADCs. It also provides the flexibility to calibrate the circuit at any reference temperature.

According to a further embodiment of the present invention, voltage reference circuit 805 can generate two (or more) different reference voltages. The two reference voltages are constant reference voltages that are divided down to the threshold voltage of the diode 806 at two different temperatures (e.g., 25° C. and 85° C.). The reference voltages are used to generate offset codes at the outputs of offset calibration circuit 804 for two different operating temperatures of the circuit.

Figure 10:
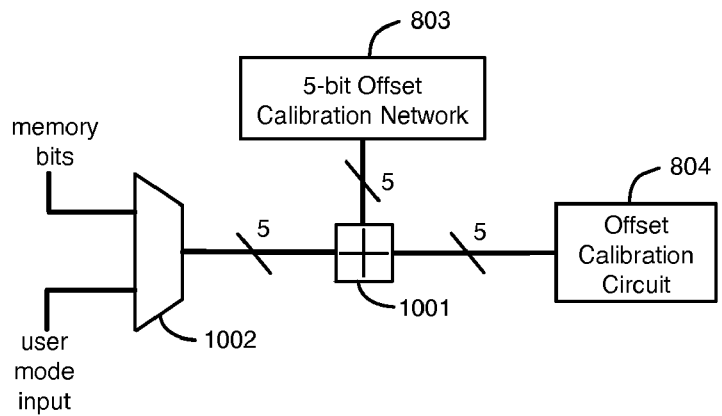
FIG. 10 illustrates circuitry that can add a fixed calibration point to the output of an offset calibration circuit, according to yet another embodiment of the present invention.

FIG. 10 illustrates an alternative embodiment of the configuration shown in FIG. 8A that allows a fixed calibration point to be added to an input of the offset calibration circuit (e.g., to compensate for offsets in the diode). In the embodiment of FIG. 10, the 5-bit offset code generated by offset circuit 804 is provided to inputs of a 5-bit adder 1001. 5-bit adder 1001 adds the 5-bit offset code with a 5-bit output of multiplexer 1002. Multiplexer 1002 selects from a set of memory bits or a set of user mode input bits and couples the selected bits to inputs of adder 1001. The memory bits or the user mode bits are selected to provide a fixed calibration point to the output of offset calibration circuit 804. The 5-bit output of adder 1001 is provided to 5-bit offset calibration network 803 as the gate control signals for the transistor network.

Figure 11:
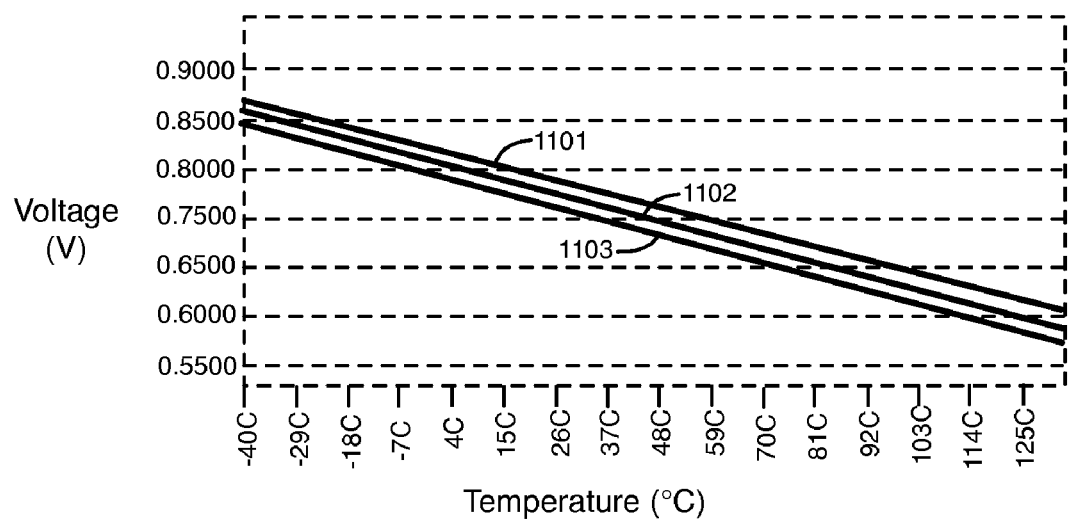
FIG. 11 is a graph that illustrates changes in the voltage across a diode in response to changes in temperature for three different processes.
Figure 12:
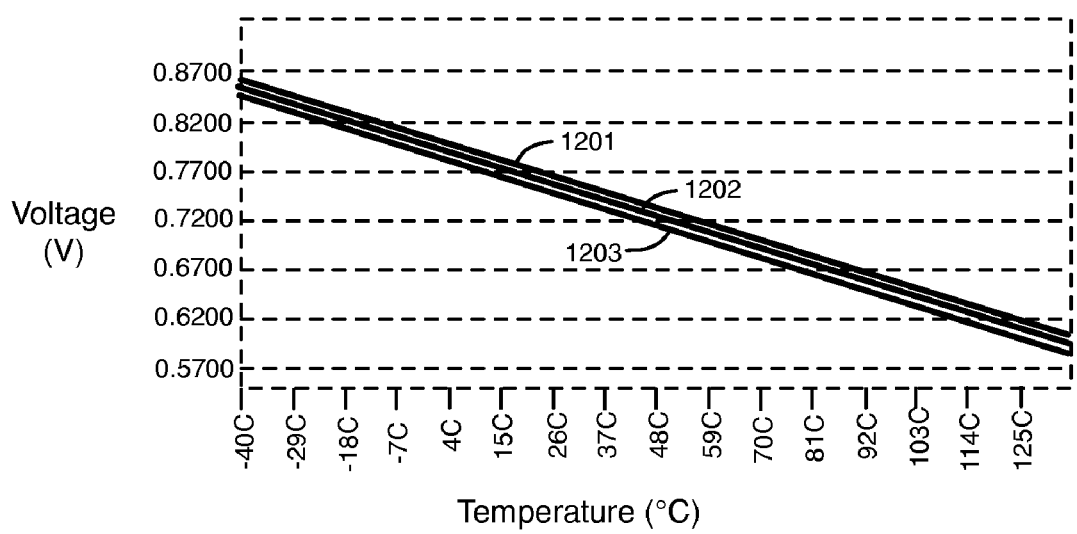
FIG. 12 is a graph that illustrates changes in the voltage across a diode in response to changes in the temperature at three different supply voltages.

FIG. 11 illustrates examples of changes in the voltage across a diode in response to changes in temperature for three different processes 1101-1103. FIG. 12 illustrates examples of changes in the voltage across a diode in response to changes in temperature for three different supply voltages 1201-1203, respectively. Using the calibration techniques of the present invention, inaccuracies in the output of the temperature sensing system that are caused by variations in process, temperature, and supply voltage can be effectively corrected. The resulting architecture is therefore robust across manufacturing and power supply variances.

Figure 13:
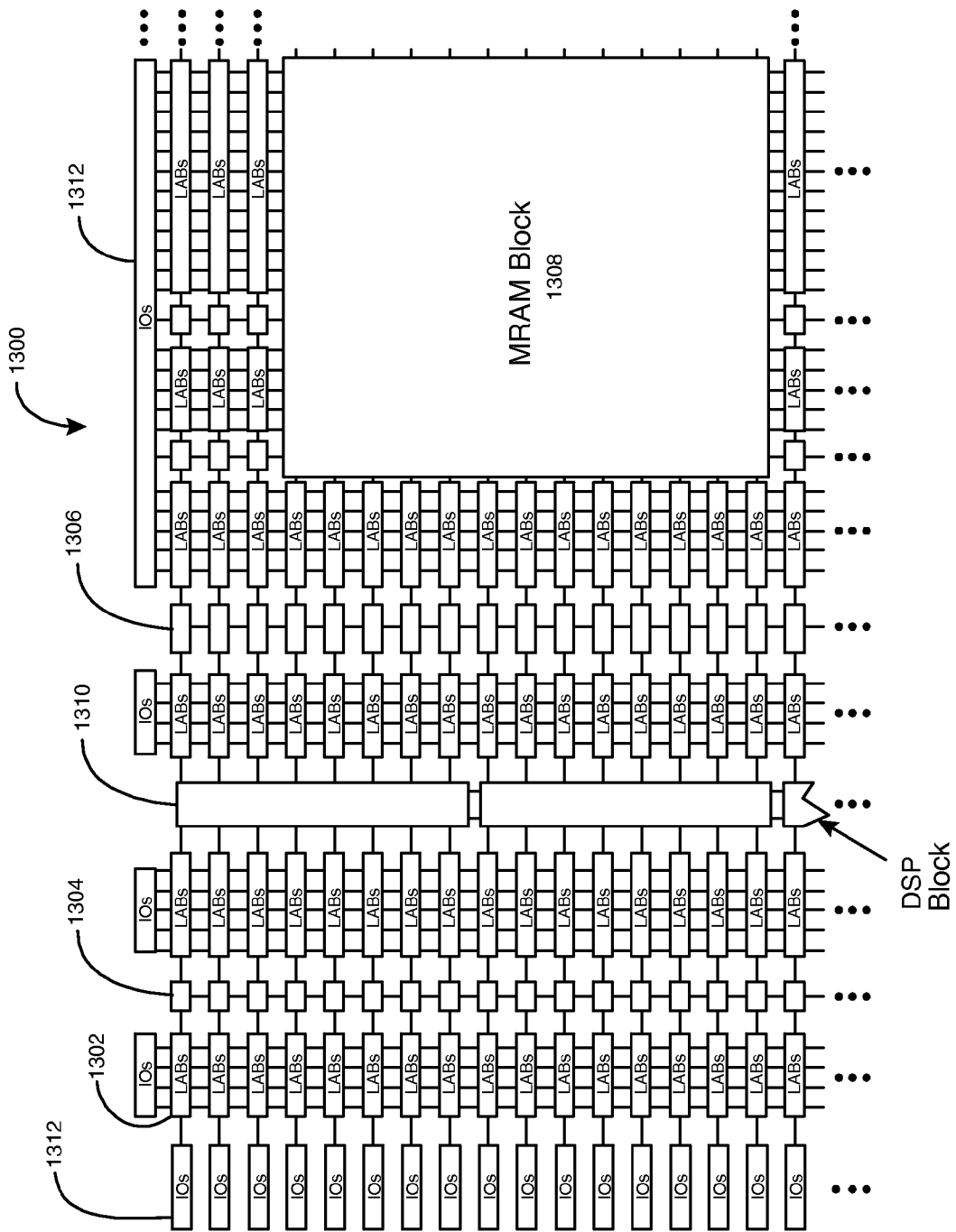
FIG. 13 is a simplified block diagram of a field programmable gate array that can embody the techniques of the present invention.

FIG. 13 is a simplified partial block diagram of an FPGA 1300 that can include aspects of the present invention. FPGA 1300 is merely one example of an integrated circuit that can include features of the present invention. It should be understood that the present invention can be applied to numerous types of circuits such as field programmable gate arrays (FPGAs), programmable logic devices (PLDs), complex programmable logic devices (CPLDs), programmable logic arrays (PLAs), and application specific integrated circuits (ASICs).

FPGA 1300 includes a two-dimensional array of programmable logic array blocks (or LABs) 1302 that are interconnected by a network of column and row interconnect conductors of varying length and speed. LABs 1302 include multiple (e.g., 10) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1300 also includes a distributed memory structure including RAM blocks of varying sizes provided throughout the array. The RAM blocks include, for example, blocks 1304, blocks 1306, and a block 1308 of RAM. These memory blocks can also include shift registers and FIFO buffers.

FPGA 1300 further includes digital signal processing (DSP) blocks 1310 that can implement, for example, multipliers with add or subtract features. Input/output blocks (IOs) 1312 located, in this example, around the periphery of the chip support numerous single-ended and differential input/output standards. It is to be understood that FPGA 1300 is described herein for illustrative purposes only and that the present invention can be implemented in many different types of PLDs, FPGAs, and the like.

Figure 14:
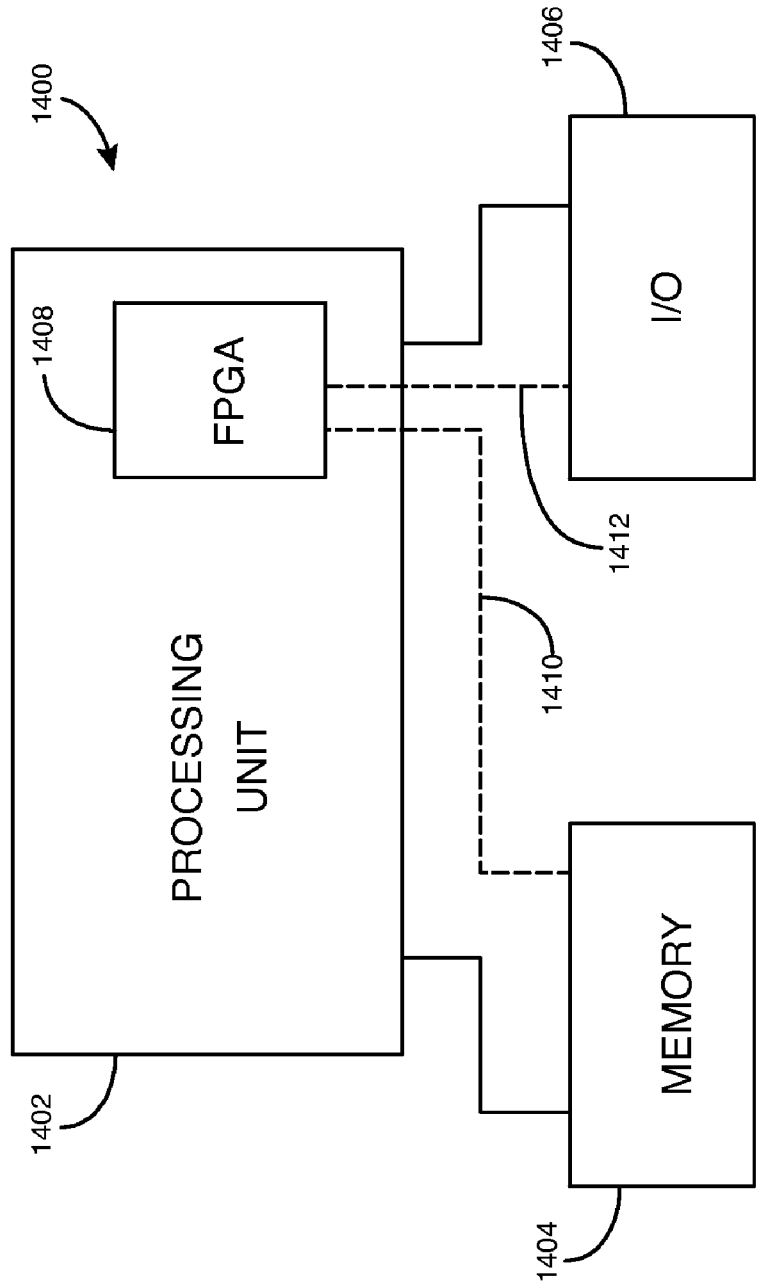
FIG. 14 is a block diagram of an electronic system that can implement embodiments of the present invention.

The present invention can also be implemented in a system that has an FPGA as one of several components. FIG. 14 shows a block diagram of an exemplary digital system 1400 that can embody techniques of the present invention. System 1400 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1400 can be provided on a single board, on multiple boards, or within multiple enclosures.

System 1400 includes a processing unit 1402, a memory unit 1404 and an I/O unit 1406 interconnected together by one or more buses. According to this exemplary embodiment, an FPGA 1408 is embedded in processing unit 1402. FPGA 1408 can serve many different purposes within the system in FIG. 14. FPGA 1408 can, for example, be a logical building block of processing unit 1402, supporting its internal and external operations. FPGA 1408 is programmed to implement the logical functions necessary to carry on its particular role in system operation. FPGA 1408 can be specially coupled to memory 1404 through connection 1410 and I/O unit 1406 through connection 1412.

Processing unit 1402 can direct data to an appropriate system component for processing or storage, execute a program stored in memory 1404 or receive and transmit data via I/O unit 1406, or other similar function. Processing unit 1402 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1408 can control the logical operations of the system. As another example, FPGA 1408 acts as a reconfigurable processor, which can be reprogrammed as needed to handle a particular computing task. Alternately, FPGA 1408 can itself include an embedded microprocessor. Memory unit 1404 can be a random access memory (RAM), read only memory (ROM), fixed or flexible disk media, PC Card flash disk memory, tape, or any other storage means, or any combination of these storage means.

The foregoing description of the exemplary embodiments of the invention has been presented for the purposes of illustration and description. It is not intended to be exhaustive or to limit the invention to the precise form disclosed. A latitude of modification, various changes, and substitutions are intended in the present invention. In some instances, features of the invention can be employed without a corresponding use of other features as set forth. Many modifications and variations are possible in light of the above teachings, without departing from the scope of the invention. It is intended that the scope of the invention be limited not with this detailed description, but rather by the claims appended hereto.

The invention claimed is:

1. An integrated circuit comprising a temperature sensing circuit, wherein the temperature sensing circuit comprises:
   a diode;
   a comparator coupled to receive a signal from the diode;
   a logic circuit coupled to receive an output of the comparator, the logic circuit generating a plurality of digital output signals; and
   a first transistor network comprising a first plurality of transistors that are coupled in parallel to receive the plurality of digital output signals from the logic circuit, and a first plurality of resistors, wherein each of the first plurality of resistors is coupled in series with one of the first plurality of transistors.

2. The integrated circuit defined in claim 1 further comprising:
   an offset resistor coupled to the plurality of resistors.

3. The integrated circuit defined in claim 1 further comprising:
   a pin coupled to the diode and an input of the comparator.

4. The integrated circuit defined in claim 1 wherein the plurality of transistors are binary weighted, and the plurality of resistors are binary weighted.

5. The integrated circuit defined in claim 1 further comprising:
   a multiplexer coupled to an input of the comparator, wherein a first input of the multiplexer is coupled to the diode;
   a first switch coupled to a second input of the multiplexer and a pin; and
   a second switch coupled to the pin and the diode.

6. The integrated circuit defined in claim 1 wherein the integrated circuit is a field programmable gate array.

7. The integrated circuit defined in claim 1 further comprising:
   a voltage reference circuit generating a reference voltage; and
   a multiplexer having a first input coupled to receive the reference voltage, a second input coupled to receive a signal from the diode, and an output coupled to the comparator.

8. The integrated circuit defined in claim 7 further comprising:
   an offset calibration circuit coupled to receive the output of the comparator; and
   a second transistor network coupled to receive an offset code from the offset calibration circuit and coupled to the first transistor network, the second transistor network comprising a second plurality of transistors and a second plurality of resistors, each coupled in series with one of the second plurality of transistors.

9. The integrated circuit defined in claim 8 further comprising:
   an adder circuit coupled to add the offset code from the offset calibration circuit to a fixed calibration code and to transmit an output code to the second transistor network.

10. A method for sending temperature on an integrated circuit, the method comprising:
    comparing a voltage across a diode with a voltage from a first transistor network using a comparator, the first transistor network comprising first transistors coupled in parallel and first resistors coupled in series with the first transistors;
    converting an output of the comparator into a plurality of digital signals; and
    selectively enabling the first transistors in the first transistor network in response to the plurality of digital signals.

11. The method defined in claim 10 further comprising:
    coupling the diode to a pin of the integrated circuit.

12. The method defined in claim 10 further comprising:
    coupling an offset resistor between the first resistors and a supply voltage.

13. The method defined in claim 10 wherein the first transistors are binary weighted and the first resistors are binary weighted.

14. The method defined in claim 10 wherein the comparator and the first transistor network comprise a dual purpose temperature sensing circuit and an on-chip calibration circuit.

15. The method defined in claim 10 further comprising:
    generating a reference voltage that is independent of process, voltage, and temperature variations;
    coupling the reference voltage to an input of the comparator using a multiplexer;
    maintaining states of the first transistors constant while the reference voltage is coupled to the comparator;
    generating a digital offset code in response to the output of the comparator; and
    selectively enabling second transistors in a second transistor network in response to the digital offset code, wherein the second transistor network includes second resistors coupled in series with the second transistors, and the second transistor network is coupled to the first transistor network.

16. The method defined in claim 15 further comprising:
    coupling the diode to the input of the comparator using the multiplexer; and
    maintaining the digital offset code constant while the diode is coupled to the comparator.

17. The method defined in claim 15 further comprising:
    adding the digital offset code to a fixed offset code to generate an adjusted offset code that is used to selectively enable the second transistors.

18. An integrated circuit comprising:
    a comparator;
    an offset calibration circuit that generates a digital offset code in response to the output signal of the comparator;
    a first transistor network selectively enabling first transistors in response to the digital offset code;
    a logic circuit that generates second digital output signals in response to an output signal of the comparator; and
    a second transistor network selectively enabling second transistors in response to the second digital signals, wherein the comparator is coupled to receive a signal from the first and the second transistor networks, and states of second transistors in the second transistor network are held constant in response to a predefined digital code during an offset calibration mode.

19. The integrated circuit defined in claim 18 wherein the digital offset code remains constant during a temperature sensing mode, while the logic circuit controls states of the second transistors in the second transistor network.

20. The integrated circuit defined in claim 19 further comprising:
   a multiplexer coupled to an input of the comparator;
   a voltage reference circuit coupled to a first input of the multiplexer; and
   a diode coupled to a second input of the multiplexer.

* * * * *